United States Patent Office 3,527,103
Patented Sept. 8, 1970

3,527,103
PHASE ANGLE DETECTOR
Howard S. Hale and Robert C. Weyrick, Akron, Ohio,
assignors to Information Development Corporation,
Akron, Ohio, a corporation of Ohio
Filed Oct. 30, 1967, Ser. No. 678,797
Int. Cl. G01m 1/22
U.S. Cl. 73—462                 11 Claims

ABSTRACT OF THE DISCLOSURE

Electronic circuitry is utilized to generate Fourier coefficients for an arbitrary periodic input which input is related in phase to a rotating object. The phase angle and magnitude of the fundamental or harmonic components of the input are detected by introducing the Fourier coefficients in a sine-cosine oscillator to produce a sinusoidal signal, and determining when the sinusoidal signal reaches maximum and when it crosses its zero axis from negative to positive in relation to the rotation of the object. A linearly driven gauge registering 360° commences movement upon a predetermined reference on the object, and is stopped to register the phase angle when the sinusoidal signal crosses its zero axis going from negative to positive. In addition, the maximum amplitude of the sinusoidal signal is a measure of the magnitude of the component, and is registered as pounds on a linearly driven gauge.

PRIOR ART

In the tire industry it is extremely important that the tires sold to the public be of the highest qualtiy for safety reasons. To this end, heretofore one of the tests to determine tire quality has been to mount the tires in an inflated condition on an axle, and force load the tires against a moving surface substantially parallel to the axle mounting the tire. Normally, this surface is a rotating drum of precise circumference, and has an exact centered rotatable relationship itself. Hence, any out of round characteristics or flaws of the tire will produce lateral and/or radial force variations which will cause slight deflections to the mounting axle. It has been the practice to mount suitable force sensitive cells in relation to the axle so that any deflections of the axle can be measured as to intensity and direction, i.e. either radial or lateral. Heretofore, whenever the radial force deflections have been above a desired safe level, that particular tire is rejected as not meeting the quality standards. However, heretofore, it has only been the practice to detect the amount of overall force variation, and not that angular relationship with respect to the tire at which the fundamental component of such force variation occurs. With equipment that can detect the phase angle, or angular relationship on the tire at which radial force variations occur, it is possible to correct the imperfection in the tire by either adding rubber, taking rubber away, or otherwise correcting that area of the tread. Normally, these force variations occur because the tire is either out of round or has a nonuniform distribution of mass of rubber or material in a particular area.

The object of the present invention is to provide apparatus which will detect the phase angle at which the fundamental component of radial deviations in tire force, as represented by deflections on the axle mounting the tire, occur during this type of test, thus making it possible to correct the imperfections in the tire because the location and magnitude of such imperfections are known.

A further object of the invention is to provide a phase angle detector which might operate with equipment other than the tire testing equipment described above, but which is particularly adapted to locate the phase angle at which periodic fluctuations occur in any variable, yet periodic signal.

The aforesaid objects of the invention and other objects which will become apparent as the description proceeds are achieved by providing an apparatus for detecting the phase angle of the fundamental component of a periodic function which includes in combination means to determine the Fourier coefficients for the fundamental component of an electrical signal representing the periodic function expressed as sine and cosine wave forms, for the tangent to the angle which is characterized by means to sum the coefficients to produce a sinusoidal signal, means to determine when the sinusoidal signal crosses its zero axis as it passes from negative to positive, means to relate the zero axis crossing of the sinusoidal signal to a reference indicating the commencement of the periodic function, and means to indicate the magnitude of the sinusoidal signal.

While it should be understood that the apparatus of the invention may be utilized to detect the phase angle and magnitude of the harmonic components at which the maximum fluctuation with respect to any periodic function, it has been particularly designed to determine the phase angle and magnitude at which the fundamental component of force fluctuation occurs in the testing for quality of a pneumatic tire, and hence it has been so illustrated and will be so described.

DESCRIPTION OF THE DRAWINGS

In order to understand the operation of the invention with respect to the testing of a pneumatic tire, reference should be made to the accompanying drawings wherein.

FOURIER COEFFICIENTS

Figure 1:
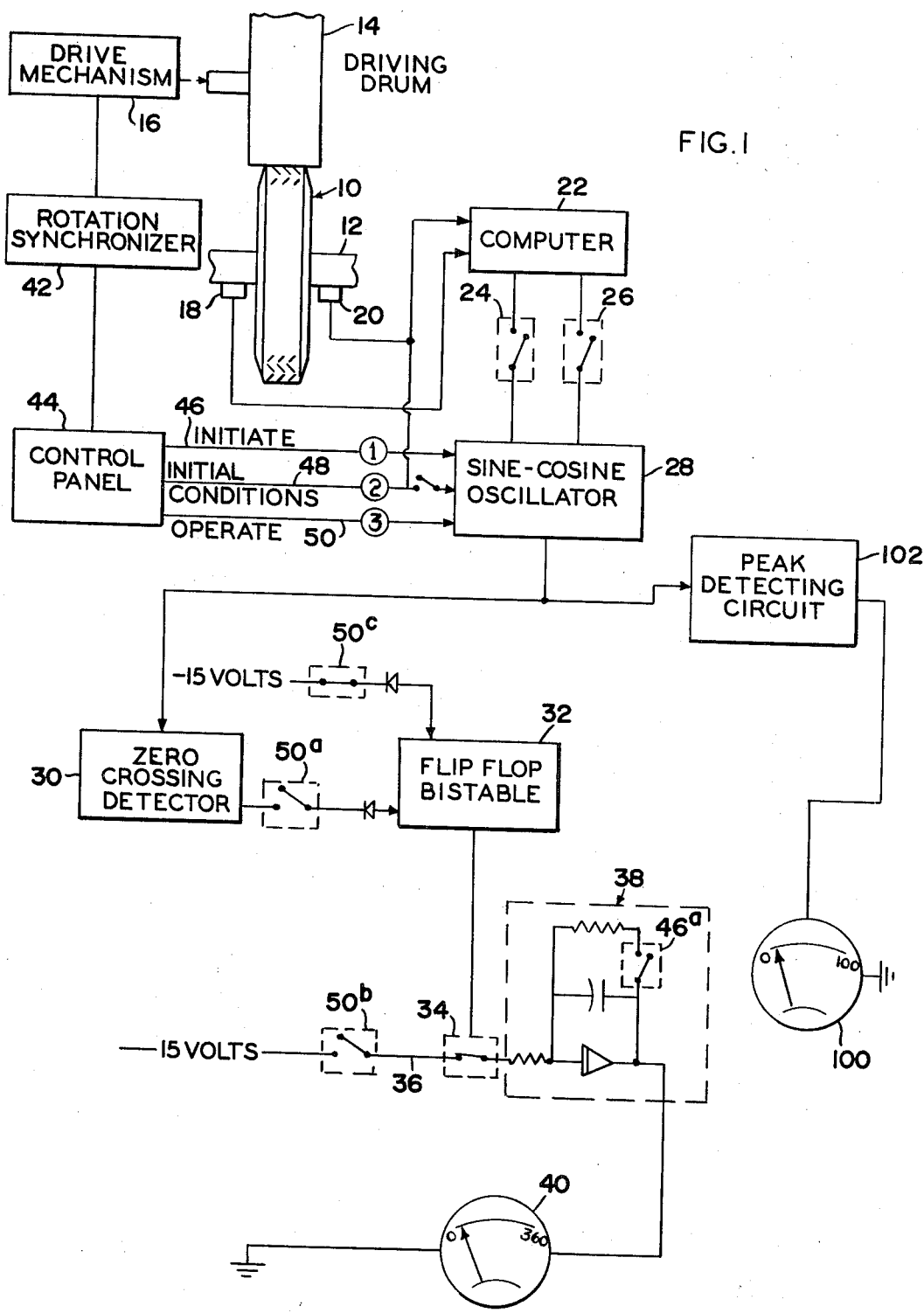
FIG. 1 is a schematic block diagram illustrating the overall combination of elements necessary to achieve the phase angle detection in a tire test arrangement.

A periodic function $f(t)$ of period T which is continuous throughout its period may be expanded into a Fourier series $$f(t) = \frac{a_0}{2} + \sum_{k=1}^{\infty} a_k \sin \frac{2k\pi}{T} t + \sum_{k=1}^{\infty} b_k \cos \frac{2k\pi}{T} t \quad (1)$$

Where the Fourier coefficients are given by $$a_k = \frac{2}{T} \int_0^T f(t) \sin \frac{2\pi k t}{T} dt \quad (2)$$

$$b_k = \frac{2}{T} \int_0^T f(t) \cos \frac{2\pi k t}{T} dt \quad (3)$$

The sine and cosine terms of Equation 1 above may be combined in single summation $$f(t) = \frac{a_0}{2} + \sum_{k=1}^{\infty} c_k \cos\left(\frac{2\pi k t}{T} - \phi_k\right) \quad (4)$$

where $$c_k = (a_k^2 + b_k^2)^{1/2} \quad (5)$$

$$\phi_k = \tan^{-1}(a_k/b_k) \quad (6)$$

The phase angle detector described hereinafter is for the purpose of obtaining the values of $c_k$ and $\phi_k$, given $a_k$ and $b_k$.

APPARATUS DESCRIPTION

Since in a tire test apparatus as defined in the explanation given above, the lateral and radial tire force runout variations are periodic over a single revolution, they may be expressed by an appropriate Fourier series. Thus, with reference to FIG. 1, it is seen that a tire 10 mounted upon an axle 12 is rotatably driven at a constant r.p.m. by a driving drum 14 which is driven by a suitable motorized drive mechanism 16, all as well known in the art. Normally, this type of arrangement is called a dynamometer and is conventional for testing tires. For the purposes of the invention, a pair of load cells 18 and 20 are suitably mounted adjacent the axle 12 wherein cell 18 may measure lateral force fluctuations to the axle 12 and cell 20 may measure radial force fluctuations to axle 12, all these caused by force variations in the tire 10 being tested since the outer surface of the circular driving drum 14 is exactly parallel to axle 12 and always maintains exactly the same relationship thereto during its full rotational movement.

The load cells 18 and 20 generate electrical signal impulses which are periodic in time for one full revolution of the tire 10 being tested. These electrical signals are sent to a computer 22 which is designed to evaluate the overall fluctuations with reference to a predetermined standard to establish the quality of the tire 10 being tested.

For the purposes of this invention, we are concerned only with the radial fluctuations picked up by unit 20, and the computation of the Fourier coefficients $a_k$ and $b_k$ of the force variations in the radial direction for at least the first and several successive harmonics.

The Fourier coefficients $a_k$ and $b_k$ may be implicitly computed by applying the periodic function $f(t)$ to a sine-cosine oscillator resonant at the frequency $2\pi k/T$ and evaluating the outputs after one period of the fundamental frequency. This technique will be more fully described as the the preferred embodiment of the invention hereinafter.

Alternately, the Fourier coefficients may be explicitly computed by generating sine and cosine wave forms of frequency $2\pi k/T$, multiplying the periodic function $f(t)$ by these voltages, and then integrating the products over one period of the fundamental frequency. In either case the Fourier coefficients generated are $a_k$ and $b_k$. Naturally, these two coefficient values may then be combined to give the single coefficient $c_k$ which is the peak fluctuation occurring at the frequency $2\pi k/T$.

The use of Fourier analysis was advanced by J. B. J. Fourier in his book La Theorie Du Chaleur. The Fourier analysis of a given periodic function represents it as a sum of a number, usually infinite, of simple harmonic components. Because the response of a linear dynamic system or a rotating dynamic system to a simple harmonic input is usually easy to obtain, the response to an arbitrary periodic input can be obtained from its Fourier analysis. In essence, therefore, the operation of computer 22 to generate $a_k$ and $b_k$ is well recognized by those skilled in the art, but for further detailed structural description of apparatus which could perform this function, reference migh be had to an article "The Generation of Fourier Transforms and Coefficients on an Analogue Computer," Harbert, Electronic Engineering, August 1960, pp. 496–499, and "Analogue Computation," vol. 4, Fifer, McGraw-Hill, 1961, pp. 976–979.

As one alternative, the invention contemplates the positioning of switches 24 and 26 in the lines carrying the Fourier coefficients $a_k$ and $b_k$ from the computer 22 to a sine-cosine oscillator 28. The purpose of oscillator 28 is to utilize the Fourier coefficients $a_k$ and $b_k$ to form a sinusoidal wave form where the phase angle $\phi_k$ is found from $$\tan^{-1}\left(\frac{a_k}{b_k}\right)$$

which is Equation 6 above. As the preferred alternative, the invention contemplates the positioning of switch 24 in the line to directly apply the radial force variation signal from the radial load cell 20 to the sine-cosine oscillator 28.

The exact operation of oscillator 28 will be more fully described hereinbelow. However, it is to be understood that a sinusoidal wave form representing the mathematical combination of the $a_k$ and $b_k$ coefficients is obtained by oscillator 28 from which $\phi_k$ is determined.

The actual determination of when $\phi_k$ occurs is achieved by a zero crossing detector 30, the exact operation of which will be more fully defined hereinbelow. In essence, however, the detector 30 determines the phase angle at which the maximum tire force variation occurs in the tire 10 being tested.

The zero crossing detector 30 sends a signal to a bistable flip-flop 32 which actuates upon such signal to control a switch 34. The switch 34 is located in a line 36 receiving a precise reference voltage input and operating through an integrator circuit 38, to drive a phase angle meter 40 from a zero scale indication to a 360° scale indication linearly over a time period equal exactly to the time for one revolution of the tire 10.

Figure 3:
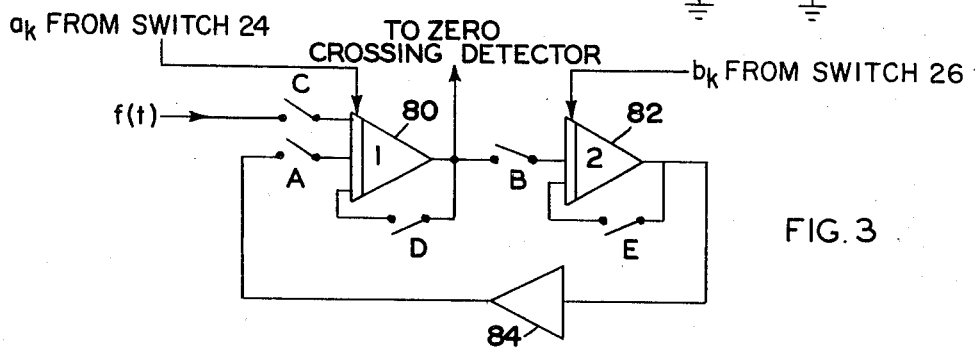
FIG. 3 is a schematic electrical diagram indicating the functioning characteristics of the sine-cosine oscillator of FIG. 1.

In operation, to achieve desired synchronization, it is necessary that a reference point on the tire 10 be established from which to begin measurement of the 360° to determine the phase at which maximum force fluctuation in a radial direction occurs. To this end, a rotation synchronizer 42 receiving an input signal from the drive mechanism 16 establishes a reference and sends this to a timing control 44. The control 44 generates an initiate test signal 46 to initialize the phase angle integrator circuit 38 by closing switches D and E in the oscillator 28, as best seen in FIG. 3, thereby driving the integrators 80 and 82 in the sine-cosine oscillator all to zero. This occurs during one revolution of the tire. During the second revolution signal 48 from the control panel 44 actuates switches A, B, and C to commence operation of the sine-cosine oscillator and to compute the Fourier coefficients $a_k$ and $b_k$. At the start of the third revolution, switch C opens and an operate signal 50 from the control panel 44 activates the bistable flip-flop 32 which actuates the solid state switch 34 to actually commence operation of the integrator and hence the desired linear movement to the needle on meter 40. Simultaneously, the operate signal 50, indicated by a circled number 3, closes a normally open switch 50a between the zero crossing detector 30 and the bistable flip-flop 32. It should be understood that the rotation synchronizer 42 sends its signal only upon the commencement of the measured rotation of the tire from a preselected reference point, and hence the movement of the needle in meter 40 represents the instantaneous phase angle of the tire from the reference point. Switch 34 is only opened to lock the needle of meter 40 at its instantaneous position when a signal is received from detector 30. Hence, it should clearly be understood that the meter 40 is stopped at the instant the sinusoidal signal from oscillator 28 crosses its zero axis from negative to positive which represents the phase angle at which the maximum force fluctuation occurs.

In accordance with the above, it is then seen that the phase angle is $$\frac{td}{T} \times 360°$$

where $td$ is the time delay in seconds between the start of oscillation or the synchronous initiate signal 50 from synchronizer 42 and the zero crossing from a negative to a positive direction of the sinusoidal signal from oscillator 28 as seen by detector 30 and T is the time in seconds for the integrator to reach full scale. Since the tire rotation frequency is identical to the oscillator frequency, the tire will rotate through an angle equal to the phase angle during the time $td$. Thus, since the reference is known, the phase angle may easily be measured to actually determine the physical location of maximum force fluctuation on the tire itself. The amount of actual force may be measured in pounds on a meter 100 which receives its actuation signal from a peak detecting circuit 102. The circuit 102 is well known by those skilled in the art. For example, see the book, "Electronic Analog and Hybrid Computers," by Korn and Korn, McGraw-Hill—1964, pp. 351, 352.

ZERO CROSSING DETECTOR

Figure 2:
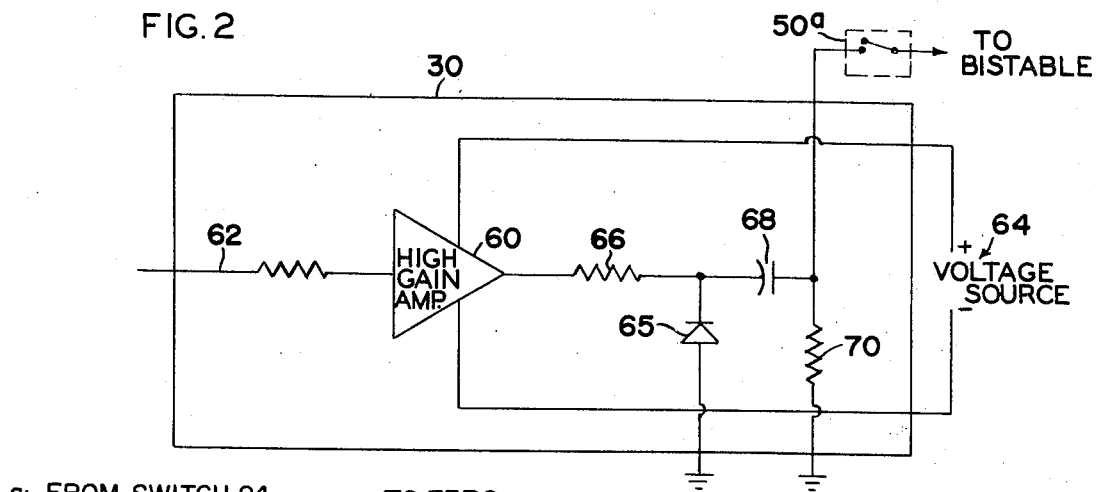
FIG. 2 is a schematic electrical diagram indicating the internal functional operation of the zero crossing detector of FIG. 1.

The operational structure of the zero crossing detector 30 is illustrated in the schematic of FIG. 2. Essentially, it incorporates a high gain amplifier 60 which has the property of inverting the polarity of any input signal from the oscillator 28 over a line 62. The amplifier 60 is powered from a voltage source 64 in a manner well known in the art. The output of the amplifier 60 is designed to be a constant level positive voltage when any negative input voltage is applied from the oscillator 28, regardless of how small the input may be, but utilizes a diode 65 to drain off all negative voltage from amplifier 60 to ground. The positive constant level voltage from amplifier 60 after passing through a suitable resistor 66 is utilized to charge a capacitor 68 with the output side of the capacitor feeding through switch 50a to the bistable 32.

Therefore, in operation, the detector 30 operates as follows: (1) whenever the sinusoidal input voltage is positive the amplifier 60 sends out a negative voltage which is immediately clamped through diode 64 to ground. (2) However, as soon as the sinusoidal wave form switches to its negative portion, the amplifier 60 switches to a positive voltage output which is blocked from going through diode 64 to ground and charges capacitor 68. The charge on capacitor 68 is designed to build up almost instantaneously because of the voltage level from the high gain amplifier 60, and once charged utilizes leakage through a resistor 70 on the output side thereof to ground. (3) As the sinusoidal wave form passes from its negative phase through zero towards its positive phase, the voltage output of amplifier 60 switches from the constant positive level immediately to a negative level which causes full drain thereof through diode 64. (4) With this unbalance in the circuit, the capacitor 68 rapidly discharges sending a pulse of current through switch 50a which is closed during circuit operation into the bistable 32 of sufficient magnitude to cause bistable 32 to switch state and actuate switch 34 to the open position. (5) This eliminates the flow of the reference voltage current driving meter 40 and in effect holds the needle at the phase angle represented by the instance of the movement of the sinusoidal wave form past zero from negative to positive.

SINE-COSINE OSCILLATOR

For an understanding of the sine-cosine oscillator and its function, reference should be made to FIG. 3 which illustrates the oscillator 28 having two integrating amplifiers 80 and 82, labeled 1 and 2, respectively, with an additional scaling amplifier 84 connected in feedback relationship between integrators 1 and 2. When the Fourier coefficients $a_k$ and $b_k$ are inserted as initial conditions into their respective integrators 80 and 82 through their appropriate switches 24 and 26, the output of this circuit is an undamped sinusoidal wave form. Initial condition voltages of the periodic function $f(t)$, through switch C may also be applied to integrators 80 and 82, so that the circuit when allowed to operate will produce $a_k$ and $b_k$ so that again the output is an undamped sinusoidal wave form. In this application the initial condition voltages from computer 22 represent the Fourier coefficients $a_k$ and $b_k$ and may be obtained by either implicit or explicit computation as described before, or they may be obtained within oscillator 28 by implicit computation from $f(t)$. Switches D and E may be controlled by panel 44 to initialize the integrators 80 and 82 as is well understood by those skilled in the art.

For example, assume that integrator 80 has zero initial condition voltage as Fourier coefficient $a_k$ is equal to zero, but the integrator 82 has some negative voltage present at its output since $b_k$ has some negative value. When the circuit is actuated or initiated by the proper pulses from the control panel 44, the resulting wave form from integrators 80 and 82 becomes $-b \sin wt$ and $-b \cos wt$ respectively. The phase angle of the single sinusoid representing the phasor sum of these two wave forms is $\tan^{-1}(0/-b) = 180°$. As pointed out above, a measure of this phase angle is obtained by detecting the time of the positive going zero crossing of the output of integrator 80. In the above example, this occurs at a time equal to $T/2$ seconds which represents 180° of one cycle of oscillation.

Since the zero crossing of one integrator output will by definition indicate either a maxima or minima of the other integrator, the absolute magnitude of the force variation may also be determined. From Equation 5 above, $c_k = (a_k^2 + b_k^2)1/2$; hence, when either $a_k$ or $b_k$ is zero $c_k$ will be $b_k$ or $a_k$ respectively. By measuring the peak voltage of either integrator 80 or 82 by means familiar to those skilled in the art the absolute magnitude of the fundamental radial force variation may be measured directly. As indicated above this is accomplished physically by detector 102 and meter 100 acting in combination.

OTHER SITUATIONS

Figure 4:
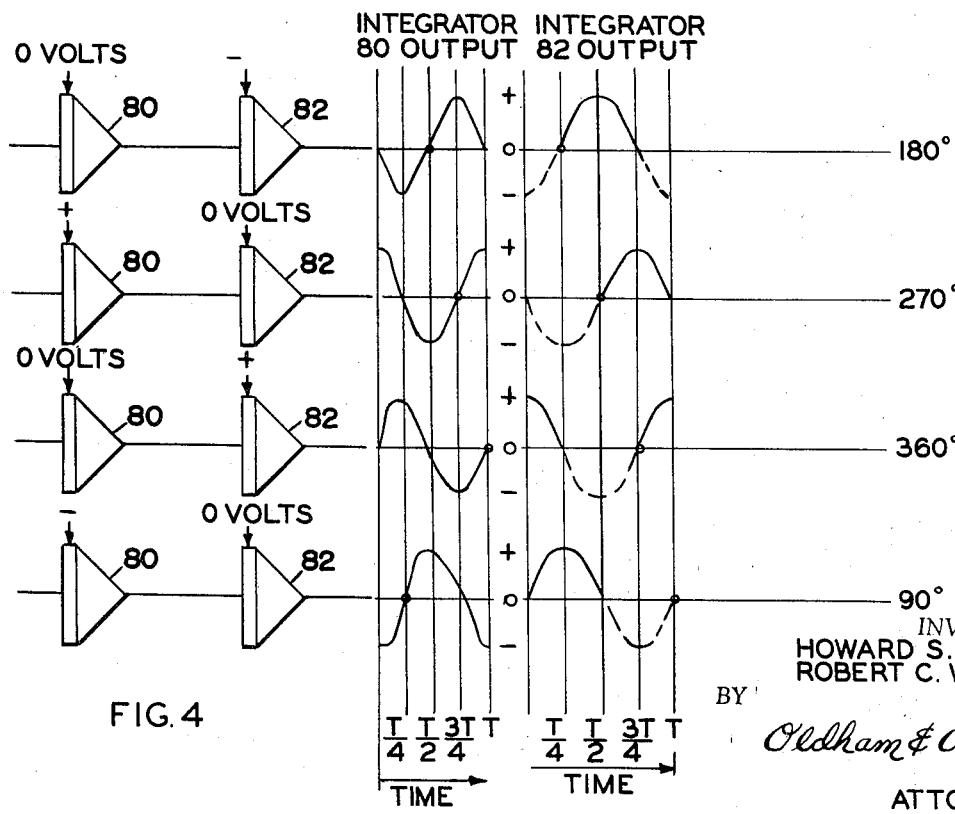
FIG. 4 is a graphic illustration of various representative phase angles, indicating how the zero crossing detector of FIG. 2 operates to detect the phase angle of maximum force fluctuation for the apparatus of FIG. 1.

FIG. 4 illustrates other typical situations for initial Fourier coefficients inserted as initial conditions into the integrators 80 and 82. The specific example given above shows that with zero volts from integrator 80 and a maximum negative voltage from integrator 82, that the zero crossing from negative to positive occurs at time $T/2$ and is 180°.

With a maximum positive voltage from integrator 80, and zero volts from integrator 82, the zero crossing occurs at time $3T/4$ or a 270° phase angle. Similarly, with zero volts from integrator 80 and a maximum positive voltage into integrator 82, the zero crossing occurs at time T or 360°. The final condition is with a maximum negative voltage from integrator 80 and zero volts from integrator 82 which makes the zero crossing from negative to positive occur at time $T/4$ or indicating 90°.

SUMMARY

Therefore, it should be understood that the phase angle detection to measure the angle of the fundamental component of radial tire force fluctuation in the runout of a pneumatic tire may be accomplished by generating the Fourier coefficients of the fundamental component as determined by appropriate analogue computer techniques which coefficients represent the sides of the angle at which such force fluctuation occurs when determined with a preselected reference. Thus, by simple trigonometric relationships, the tangent of the angle is one coefficient divided by the other, or vice versa for the cotangent. If these coefficients are impressed upon a sinusoidal wave form oscillator to generate a sinusoidal wave form of their own, the point of this wave form first crossing its zero axis going from negative to positive represents the phase angle at which maximum fluctuation occurs, as clearly shown by the analysis above with reference to FIG. 4. Thus, it is only necessary to determine at what instant in relation to time for the fundamental frequency of rotation of the tire being tested that such zero crossing occurs, and relating this to some type of meter to give the phase angle detection desired. This is accomplished in the instant invention by appropriate circuitry to charge a capacitor only whenever the sinusoidal wave form is in its negative path whereby the discharge of the capacitor occurs instantaneously as it passes from negative to positive through a zero axis, and the discharge of the capacitor triggers the stoppage of current flow to a meter driven linearly with respect to time from zero to 360°.

However, while in accordance with the patent statutes, only the preferred embodiment of the invention as presently utilized has been described in detail, it is to be understood that the angle detection apparatus of the invention may be utilized in other circumstances, and that the scope of protection in the instant application is to be determined by the appended claims:

What is claimed is:

1. In an angle detector the combination of
   an object rotatable about an axis, means to detect the amount of fluctuations in the rotation of said object with respect to said axis as an electrical signal, and means to detect the angular relation of said fluctuations with respect to the axis and a reference on said object which comprises
   a computer receiving the electrical signal representing fluctuations and synchronized with the revolutions of the object to provide two electrical signals representing the Fourier coefficients for the fluctuation,
   means to utilize the two electrical signals representing the Fourier coefficients and generate a sinusoidal signal whose phase angle depends thereon,
   zero detector means to determine when the sinusoidal signal passes from negative to positive the first time with respect to its axis with such determination beginning in time with the reference on said object,
   a gauge indicating a 360° range for one full revolution of the object,
   means to drive the gauge linearly with respect to time so that gauge would move from a zero degree indication to a 360° indication in exact synchronization to one constant speed rotation of the object if continuously driven, and
   means actuated by the zero detector means to stop the gauge in whatever position it holds at that instant in time when the sinusoidal signal passes through zero from negative to positive.

2. An angle detector according to claim 1 where the means to utilize the two electrical signals representing the Fourier coefficients includes a circuit comprising two series connected integrators and a scaling amplifier connected in feedback relationship between the output of the connected integrators to the input thereof, and where one coefficient is fed as the initial condition to one integrator and the other coefficient as initial condition to the other integrator, and where the undamped frequency of the circuit is a pure sine wave of a frequency equal to the frequency of rotation of the object.

3. An angle detector according to claim 1 where the zero detector includes a circuit comprising a high gain amplifier which produces an inverted constant voltage level output signal dependent upon the polarity of the input sinusoidal signal, a diode situated in the circuit to bleed to ground all negative voltage output from the amplifier, and a capacitor to charge upon a positive voltage output from the amplifier and discharge rapidly upon a change of the polarity of the voltage output of the amplifier.

4. An angle detector according to claim 3 which includes a two state switch and where the discharge of the capacitor actuates the switch, said switch when actuated stopping the linear movement of the gauge.

5. An angle detector according to claim 4 where the means to drive the gauge is an integrator which builds an electrical signal to a peak linearly with time and where the time to build the peak is equal exactly to the time for one rotation of the object.

6. In an apparatus to determine for a tire to be tested the radial tire force runout variations, and the angle thereof with respect to a reference on a tire, the combination of means to rotate the tire about an axle, means to run the tire against a surface exactly parallel to the axle whereby fluctuations in the tire pressure against said surface will be reflected in deflections of the axle, means to represent the deflections of the axle as a fluctuating electrical signal which is characterized by
   a sine-cosine oscillator receiving the electrical signal and determining the Fourier coefficients of the force variations which identify the tangent of the angle of the tire with respect to its reference for a preselected fluctuation at any instant of time during one rotation,
   means to impress the coefficients onto a sinusoidal wave form to establish the phase of a sinusoidal signal representing the Fourier coefficients,
   means to determine when the sinusoidal signal crosses its zero axis as it passes from negative to positive, and
   mean to relate the zero axis crossing of the sinusoidal signal to the reference on the tire to determine the phase angle at which the predetermined fluctuation occurs.

7. An apparatus according to claim 6 where the maximum deflection is the one for which the Fourier coefficients are determined.

8. An apparatus according to claim 6 where the zero detector includes a circuit comprising a high gain amplifier which produces an inverted constant voltage level output signal dependent upon the polarity of the input sinusoidal signal, a diode situated in the circuit to bleed to ground all negative voltage output from the amplifier, and a capacitor to charge upon a positive voltage output from the amplifier and discharge rapidly upon a change of the polarity of the voltage output of the amplifier.

9. An apparatus according to claim 6 which includes a two state switch and where the discharge of the capacitor actuates the switch, said switch when actuated stopping the linear movement of the gauge.

10. An apparatus to determine the magnitude and phase angle of the harmonics of a periodic function which is characterized by
    a sine-cosine oscillator consisting of two integrators in series and a scaling amplifier connected in a feedback configuration between the two integrators,
    means to control the inputs to the two integrators in synchronization with the periodic function consisting of initializing the two integrators to zero during the first cycle, forcing the first integrator in a closed loop configuration with the periodic function during the second cycle and allowing the oscillator to oscillate freely during the third cycle,
    means to measure the phase angle during the third cycle by determining when the signal goes from negative to positive the first time with respect to a predetermined reference at the start of the third cycle.

11. An apparatus according to claim 10 which includes means to measure the peak voltage of the periodic function and display it as the magnitude of the harmonic in question.

References Cited

UNITED STATES PATENTS

| | | | |
|---|---|---|---|
| 3,151,485 | 10/1964 | Federn et al. | 73—462 |
| 3,336,809 | 8/1967 | Hack | 73—462 |
| 3,376,733 | 4/1968 | Trimble et al. | 73—462 XR |

JAMES J. GILL, Primary Examiner

U.S. Cl. X.R.

324—77